J. H. HOBBS.
DESIGN FOR GLASS GOBLET-MOLD.
Reissued Jan. 18, 1876.
No. 6,861.
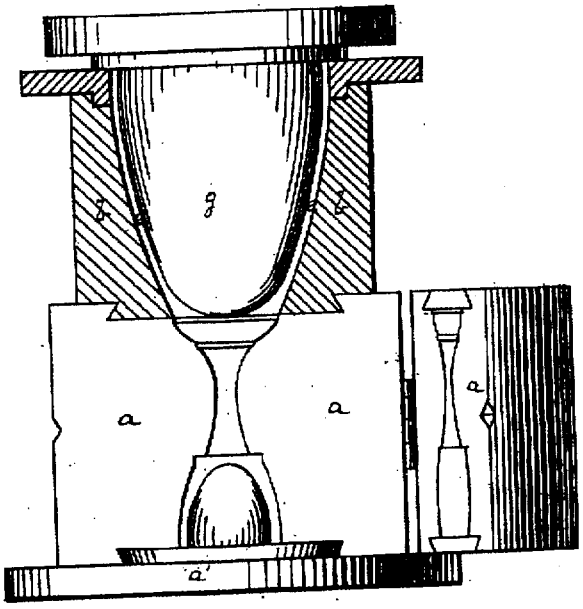
Witnesses
Claudius L Parker
J. E. Boggs.
Inventor: John H. Hobbs,
By George H. Christy
atty for him and
his Assignees.

UNITED STATES PATENT OFFICE.

JOHN H. HOBBS, OF WHEELING, WEST VIRGINIA, ASSIGNOR TO J. H. HOBBS BROCKUNIER & CO. OF SAME PLACE.

DESIGN FOR GLASS-GOBLET MOLDS.

Specification forming part of Design No. 6,804, dated August 19, 1873; reissue No. 6,861, dated January 18, 1876; application filed January 10, 1876.

DIVISION B.

*To all whom it may concern:*

Be it known that I, JOHN H. HOBBS, of Wheeling, in the county of Ohio, State of West Virginia, have invented a new and useful Design for Pressed Glass-Goblet Molds; and I do hereby declare the following to be a full, clear, and exact description thereof, reference being had to the accompanying drawing making part of this specification, which is a vertical section of a glass-mold, showing the design of bowl-cavity and plunger.

The lower part of the mold may be made in two parts, *a a*, arranged on a base-plate, *a'*, with suitable cavities for the foot and stem parts of the goblet to be made. On this lower part I arrange the unjointed upper part *b*, which has a bowl-cavity, *e*, of the peculiar taper form shown open at the lower end over the stem-cavity, and with its up-and-down lines of its sides approaching nearly or quite to straight lines through the greater part of their length. The up-and-down lines of the plunger *g* are parallel to the lines of the cavity, except toward their lower ends, as shown.

I claim herein—

The design of tapered bowl-cavity and plunger in a glass-mold, substantially as shown and described.

In testimony whereof I, the said JOHN H. HOBBS, have hereunto set my hand.

JOHN H. HOBBS.

Witnesses:

JAS. CUMMINS,

B. M. HILDRETH.